(12) United States Patent　　　　(10) Patent No.: US 12,687,380 B2
Donnell　　　　　　　　　　　　　(45) Date of Patent: Jul. 21, 2026

(54) PRECISION CUTTING GUIDE SYSTEM

(71) Applicant: Michael Donnell, Sandy, UT (US)

(72) Inventor: Michael Donnell, Sandy, UT (US)

( * ) Notice: Subject to any disclaimer, the term of this patent is extended or adjusted under 35 U.S.C. 154(b) by 866 days.

(21) Appl. No.: 18/048,550

(22) Filed: Oct. 21, 2022

(65) Prior Publication Data

US 2023/0140756 A1 May 4, 2023

Related U.S. Application Data

(60) Provisional application No. 63/271,013, filed on Oct. 22, 2021.

(51) Int. Cl.
G01B 3/1061 (2020.01)
G01B 3/1069 (2020.01)

(52) U.S. Cl.
CPC .......... G01B 3/1061 (2013.01); G01B 3/1069 (2020.01)

(58) Field of Classification Search
CPC .... G01B 3/1061; G01B 3/1069; B27B 27/10; B27B 27/08; B26D 5/00
See application file for complete search history.

(56) References Cited

U.S. PATENT DOCUMENTS

| | | | |
|---|---|---|---|
| 3,718,061 A | 2/1973 | Wilkin | |
| 4,191,111 A | 3/1980 | Emmert | |
| 5,794,145 A | 8/1998 | Milam | |

| | | | | |
|---|---|---|---|---|
| 6,886,462 B2 | 5/2005 | Dick et al. | |
| 7,792,602 B2 | 9/2010 | Dick | |
| 8,336,432 B1 * | 12/2012 | Butler | B27G 19/02 |
| | | | 83/477.1 |
| 8,783,140 B2 * | 7/2014 | Dick | G05B 19/18 |
| | | | 83/13 |
| 9,061,414 B2 * | 6/2015 | Sattler | B25H 1/0064 |
| 9,943,975 B2 * | 4/2018 | Dick | B26D 3/02 |
| 10,442,106 B2 * | 10/2019 | Gass | B27B 27/02 |
| 11,536,552 B1 * | 12/2022 | Luckey | G01B 3/1069 |
| 11,597,045 B2 | 3/2023 | Dick et al. | |
| 12,415,290 B2 * | 9/2025 | Suhling | B27B 27/04 |
| 2004/0027038 A1 | 2/2004 | Gaesser | |
| 2006/0101961 A1 * | 5/2006 | Etter | B27B 27/02 |
| | | | 83/520 |
| 2011/0056344 A1 | 3/2011 | Dick et al. | |
| 2012/0145423 A1 * | 6/2012 | Sattler | F16H 19/04 |
| | | | 173/46 |

(Continued)

*Primary Examiner* — Yaritza Guadalupe-Mccall

(74) *Attorney, Agent, or Firm* — TechLaw Ventures, PLLC; Bretton L. Crockett

(57) ABSTRACT

This disclosure extends to systems, apparatus, and methods for indicating the desired placement of material in relation to a cutting machine to achieve a desired cut. A digital precision guide system comprising a digital guide rail configured to be positioned adjacent to a cutting machine, wherein the digital guide rail and a user interface comprising a processor, wherein the processor is configured to receive at least a desired cut length from the user interface and indicate the desired cut length away from a blade of the cutting machine. The desired cut length may be indicated by actuating an LED indicator tick mark or moving a trop member to an appropriate position for placement of the material to be cut. The system may further include at least one of a digital tape measure or a digital angle measurement device.

20 Claims, 7 Drawing Sheets

(56)         References Cited

U.S. PATENT DOCUMENTS

2013/0036890 A1*   2/2013   Dick ...................... B27B 27/10
                                                                    83/468.7
2013/0205564 A1*   8/2013   Dick ...................... B27B 27/10
                                                                    83/34
2023/0140756 A1*   5/2023   Donnell .................. B27B 27/08
                                                                    33/628
2025/0065530 A1*   2/2025   Suhling ............... B23D 59/001

* cited by examiner

PRECISION CUTTING GUIDE SYSTEM

CROSS-REFERENCE TO RELATED APPLICATIONS

This application claims the benefit of U.S. Provisional Application No. 63/271,013, filed Oct. 22, 2021, the disclosure of which are incorporated herein by reference in its entirety.

TECHNICAL FIELD

This disclosure relates to a digital precision cutting guide system, which can be used with woodworking, metalworking, or other type of cutting machinery and related methods, systems, and devices.

BACKGROUND

Professional and hobby woodworkers, metalworkers, and the like use a tape measure and various saws to get an accurate measured cut. Miter saws typically range in cost from $100 to over $1,500 without accessories and are used to cut a variety of materials. Numerous accessories are available to enhance the saw's functionality, including built in measuring tools (e.g., laser cutting indicators), production stops, and work clamps. These accessories are designed to increase accuracy, ease of use, and speed of production.

Accurate measurements are critical, particularly with precision woodworking and metalworking. The introduction of human error has made the ability to obtain an accurate cut prone to error. These errors can be compounded when measurements are at atypical lengths (e.g., increments of fractions of an inch), or include a non-right-angle cuts either horizontally, vertically, or both.

SUMMARY

The disclosure describes digital precision guide systems that can be used with various cutting machinery (e.g., miter saws, table saws, band saws, or other cutting devices) to obtain accurate and precise measured cuts on a piece of material even when the cuts are being made at atypical lengths or include non-right angle cuts. While the below disclosure primarily describes aspects of the invention with respect to woodworking machinery, the concepts of the digital precision guide system can be used in other applications, including metalworking or other activities that require accurate and precise measured cuts.

Digital precision guide systems in accordance with the present disclosure allow a user to easily input a desired length and optional angle of cut (e.g., vertical angle, horizontal angle, or both) that the user would like to obtain based on a particular piece of material. The precision guide system includes a guide rail that provides a digital indicator tick mark, such as an LED indicator, along the guide rail corresponding to the alignment position that the workpiece should be set to obtain the desired cut.

In some examples, the disclosure describes digital precision guide systems comprising a digital guide rail configured to be positioned adjacent to a cutting machine, wherein the digital guide rail comprises a plurality of LED indicator tick marks, the plurality of LED indicator tick marks being separated by set intervals; and a user interface comprising a processor, wherein the processor is configured to receive at least a desired cut length from the user interface and illuminate a corresponding LED indicator of the plurality of LED indicator tick marks that corresponds to the desired cut length away from a blade of the cutting machine. The system may further include at least one of a digital tape measure or a digital angle measurement device.

In some examples, the disclosure describes digital precision guide systems comprising a digital guide rail and stop mechanism. The stop mechanism may be motorized to move along the digital guide rail to correspond to the desired cut length away from a blade of the cutting machine, which could include corresponding to a tick mark. Such movement may be facilitated using a motorized track that moves the stop mechanism into a desired position, a drive belt or other suitable mechanism. Such stop mechanisms can help to physically show where the end of workpiece should be positioned along guide rail. Additionally, such a stop may be able to be moved out of position to allow the cutting machine to be used in a normal manner without the system. Such systems may further include a user interface comprising a processor, wherein the processor is configured to receive at least a desired cut length from the user interface and move the stop to the position that corresponds to the desired cut length away from a blade of the cutting machine. The system may further include at least one of a digital tape measure or a digital angle measurement device.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles, or the like, which has been included in the specification is not to be taken as an admission that any or all these matters form part of the prior art base or were common general knowledge in the field relevant to the disclosure as it existed before the priority date of each claim of this disclosure.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

Figure 1:
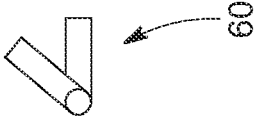
FIG. 1 is schematic illustration of one illustrative embodiment of an example digital precision guide system in accordance with the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The disclosure extends to methods, systems, and devices for precision guide systems and devices for use with cutting machines. In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

Before the methods, systems and devices of the present disclosure are discussed and described, it is to be understood that this disclosure is not limited to the particular configurations, process steps, and materials disclosed herein as such configurations, process steps, and materials may vary somewhat. It is also to be understood that the terminology employed herein is used for the purpose of describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

Current miter saw systems on the market rely on the user to get a proper measurement and align the workpiece on the saw at exactly the right place to make a cut at the desired length. Some common user mistakes that cause an error in making such measurements or cuts can include, but are not limited to, making measurements at a particular location (e.g., the location the material is to be installed) and then transferring the measurements to the material inaccurately, confusing the tick marks on the measuring device when performing such transfers (e.g., seeing the measurement being 0.5 inches away from a 65 inch mark and either getting 65.5 inches or confusing it with 64.5 inches), getting confused by the tick marks on a tape measure which can range from every ⅛ of an inch to every 1/64 of an inch, using a measuring device that has insufficient precision for the given task, confusing metric and imperial measurements, failing to account for the width of the cutting blade, cutting on the wrong side of a given measurement mark, introducing more complex geometry inaccurately into the cut or measurement, and the like. These errors can lead to the workpiece being unsuitable for a given task, require extra cuts to be made in order to "shave" the workpiece down to size, and increased time and costs of production. Some workpieces, such as exotic woods, can be extremely costly to replace. Additional cuts can also enhance the ware on the machinery, which costs a user time.

A miter saw can be the ideal tool to use for cutting material at an angle. A typical 90° angle is relatively straightforward and involves placing the material snug against the base and fence of the saw and cutting the workpiece at the desired length. With an atypical cut, there can be multiple points where human error can be introduced. While determination of the proper length or angle can be determined through trigonometry, these calculations can be time-consuming or challenging for the average hobbyist. The challenge in determining where to cut a particular workpiece can be compounded by the introduction of different angles. Such angles include both the vertical cut angle (e.g., bevel angle 513), which refers to the angle that the blade intersects the base of the cutting machine. Thus a 90° vertical angle corresponds to standard flush cut while a theoretical 0° angle would correspond to the blade being parallel to the base of the saw. The other angle is referred to as the horizontal cut angle (e.g., rotation angle 511), which refers to the angle that the blade intersects with the fence of the saw. Thus a 90° horizontal angle corresponds to a standard flush cut while a theoretical 0° angle would correspond to the blade being parallel to the fence of the saw. Cutting materials where both a non-90° vertical and horizontal cut angle are incorporated can be particularly challenging to calculate for the average user, even more so when both ends of the material include such compounded angles. Such complex cuts are significantly prone to error. To avoid needing to calculate such complex angles or lengths, often a user might make a cut that too long and use a shaving technique to trim down the material to the correct length. This trial-and-error approach can cost the user significant time investment and requires multiple trips back and forth between the cutting site and the location the workpiece is to be installed. The disclosed digital precision guide system offers the ability for the user to input a desired length, horizontal cut angle, and vertical cut angle, to obtain a conveniently readable tick mark along a guide rail to align the material in order to obtain the desired cut dimensions.

FIG. 1 shows an example digital precision guide system 10 that can be incorporated with a machine cutting device (e.g., miter saw 12) to obtain accurate and precise cuts within a workpiece 20. While the machine cutting device is illustrated as miter saw 12, precision guide system 10 can be included with other cutting devices including, for example, table saws, band saws, radial arm saws, and the like. Miter saw 12 includes base 17, fence 13, and blade 11.

Digital precision guide system 10 includes a user interface 14 and processor 15 and guide rail 16. Guide rail 16 is aligned with fence 13 of miter saw 12 and operates as a backstop by which the material to be cut (e.g., workpiece 20) can be placed and aligned. Guide rail 16 includes a plurality of digital tick marks 18 spaced apart at defined increments. During operation, a user can input a specified set of measurements into a user interface 14 and processor 15 corresponding to a desired cut the user would like to make within a particular workpiece 20. These measurements may include one or more of the desired length of cut to be made, the vertical cut angle, the horizontal cut angle, the width of workpiece 20, the thickness of workpiece 20, and the corner of workpiece 20 aligned against fence 13 and base 17. Based on the inputted of values, processor 15 can perform the necessary calculations using conventional trigonometric/geometric algorithms to determine where along guide rail 16 that workpiece 20 should be placed to obtain the desired compound angle and length of cut. User interface 14 and processor 15 can then illuminate the corresponding digital tick mark 18a that will allow the user to obtain the desired cut in workpiece 20. Thus, the user only needs to ensure workpiece 20 is aligned at digital tick mark 18a, and that miter saw 12 is set to the desired vertical and horizontal cut angles to conveniently obtain the desired cut.

Digital tick marks 18 can include individual LEDs that are in communication with user interface 14 and processor 15, thereby allowing processor 15 to illuminate the individual tick mark 18a corresponding with the desired cut. Tick marks 18 can be spaced at any equally spaced intervals that correspond with conventional measurements. For example, tick marks 18 may be spaced every ¼ inch, every ⅛ inch, every ¹⁄₁₆ inch, or every ¹⁄₃₂ inch. Additionally, or alternatively, tick marks 18 may be spaced using typical metric measurements (e.g., every millimeter or the like). In some examples, tick marks 18 can be aligned along a singular axis or multiple axes. If tick marks 18 are aligned along a single axis, the width of a conventional LED may limit how small of an increment tick marks 18 can be spaced. In situations where a more precise increment is desired, tick marks 18 may be aligned in multiple rows in a staggered formation, thereby allowing greater precision to be obtained. Tick marks 18 may also be overlaid with a masking material that limits the visually observed size of each tick mark 18, thereby improving the precision that can be obtained by tick marks 18.

User interface 14 and processor 15 may include the necessary processing circuitry and components needed to perform the described trigonometric/geometric calculations to obtain the desired cut. Such components may include, but are not limited to, one or more central processing units, hard drives, virtual memory, wireless communication components, circuit boards, UI input components, display screens, power supply, and the like.

In some embodiments, processor 15 may perform all necessary trigonometric/geometric calculations based on the desired length by which workpiece 20 is to be cut in relation to pivot point 22. Pivot point 22 corresponds to the location at which blade 11 intersects both fence 13 and base 17. In ideal arrangements, pivot point 22 remains constant in reference to blade 11 regardless of the cut angle, particularly with high precision machines. In a simple right angle cut (e.g., a cut where both the vertical and horizontal cut angles are 90°), a user can input the desired cut length for workpiece 20, and user interface device and processor 14 will illuminate tick mark 18a that corresponds to that distance away from pivot point 22.

While the benefits of digital precision guide system 10 can be obtained with simple 90° cuts, the system offers significant advantages in making cuts in materials having horizontal cut angles, vertical cut angles, or both that can be difficult to calculate by the average user. To calculate the end point in a single angle cut, three pieces of information may be needed; the angle of the saw (e.g., the horizontal or the vertical angle), the width of the material, and the desired total length along one of the corners/sides. When using both axes to make a cut, a user may also need to know the height of the material and the second angle. The math with five variables can be complicated for the average user. Thus, allowing user interface 14 and processor 15 to perform such calculations can significantly improve the accuracy in performing such calculations but also assist with user confidence in approaching such complicated cuts.

In some examples, the calculations may be simplified somewhat by setting up digital precision guide system 10 such that all measurements and calculations are performed relative to pivot point 22. In examples where the user desires to include a vertical cut angle or horizontal cut angle, the user can input the desired length from pivot point 22 (e.g., inside corner cut) into the user interface device 14. Thus, the user would only need to know the length of the corner that aligns with fence 13 and base 17. This in turn can help minimize user error often attributed with failing to account for the thickness of blade 11 or additional complications associated with incorporating the thickness of the material or the width of the material. The goal of digital precision guide system 10 being to diminish errors and improve accuracy and precision in making complex or simple cuts, while simultaneously speeding up the user's ability to get work done with minimal waste, all of which reduces costs to the user.

Additionally, or alternatively, user interface 14 and processor 15 may be configured to allow the user to selectively input which corner/side, relative to pivot point 22, the length of cut is being measured. The user can input a desired length for the corresponding corner into user interface device and processor 14 along with an indication of which corner is being measured relative to the corner that intersects pivot point 22. The user can further provide the width and thickness of workpiece 20, and processor 14 can perform the complex trigonometric/geometric calculations to determine where workpiece 20 should be aligned along guide rail 16 to obtain the desired cut length.

Figures 4, 5, 6:
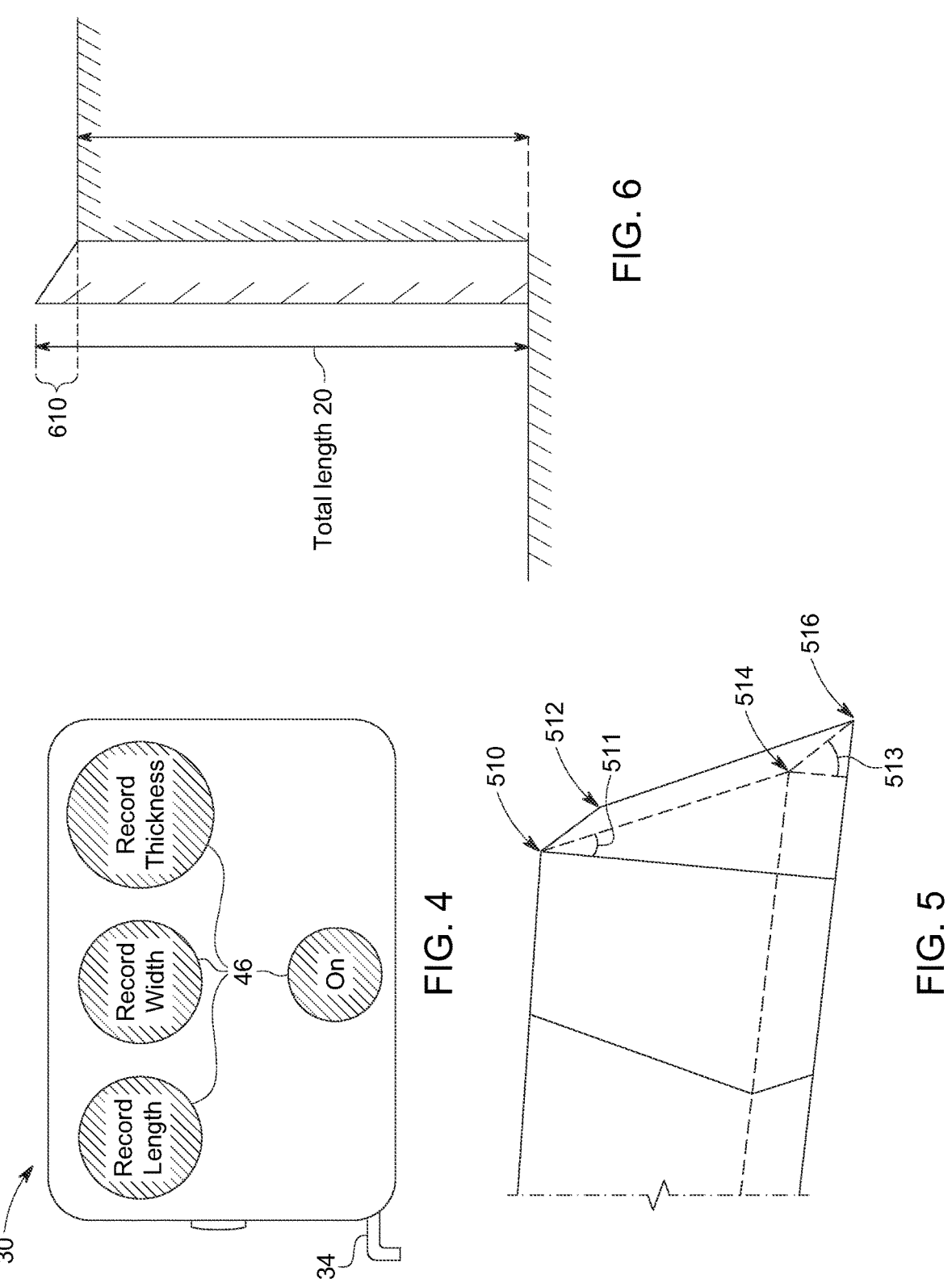
FIG. 4 is another view of the digital tape measure of FIG. 2.
FIG. 5 is an illustration of the various identified edges within a compound cut.
FIG. 6 is an illustration of a cut trim board be mounted against a wall.

In some examples, the general shape of the material (e.g., half round or other decorative trim boards) to be cut may limit which corner can be aligned with pivot point 22. In such events, the user may need to align a different edge/corner of the material with pivot point 22. These corners may be characterized as the inside short corner 510, inside long corner 512, outside short corner 514, or outside long corner 516 as shown in FIG. 5. The user can select via user interface 14 which associated corner is being aligned with pivot point 22 while processor 15 performs the appropriate calculations to determine where tick mark 18a should be placed to provide the proper length of cut. The length input by the user would therefore correspond to the desired length in relation to the selected corner.

In examples where both ends of workpiece 20 include non-90° angle cuts, the user may further specify which associated corners of both ends of workpiece 20 is being aligned with the tick that intersects between the fence and base of the saw. Processor 15 may then perform the additional calculations to determine where the corner should be aligned and which tick mark 18a should be illuminated. It should be appreciated that when only a single angle cut is being made (e.g., only a horizontal angle cut or only a vertical angle cut is being made), workpiece 20 will only include an inside edge/corner and an outside edge/corner, thereby simplifying the calculations and alignment positions. The user could cycle between; inside to inside, outside to outside, and inside to outside measurements alignments (e.g., in reference to the two ends of workpiece 20) via user interface 14 to obtain the proper orientation for processor 15 to calculate the desired alignment for the workpiece 20. In some examples, user interface 14 may be programmed with convenient pictorial representations of the alignment of workpiece 20 relative to pivot point 22 for the proper selection and positioning of the selected corner/edge being aligned.

In some examples, the disclosed system 10 may be particularly beneficial for installing trim boards. In such examples, the user may measure the length of the wall needing to receive the trim piece. However, as shown in FIG. 6, due to the incorporation of the appropriate angle (e.g., 45°), the trim piece may be longer than the wall to obtain the proper joint, as indicated at 610. The additional length needed to accommodate the desired angle cut may be characterized by Equation 2 shown below. The additional length may be added to the total desired length (e.g., the length of the wall) and the appropriate tick mark 18a may be illuminated by processor 15 to obtain the target cut length for the trim board.

Digital precision guide system 10 offers several advantages and conveniences to the user. Such advantages include reduction of user error affiliated with taking measurements and transferring them to a workpiece. As discussed further below, further improvements can be made by using a digital tape measure 30 or a digital angle measurement device 60 configured to communicate directly with user interface 14 and processor 15. Digital tape measure 30 permits the user to measure a desired length (e.g., the place workpiece 20 is to be installed) and automatically upload precise and accurate measurements to user interface 14 and processor 15, thereby eliminating a possible source of user error in manually entering such measurements.

Digital precision guide system 10 performs such calculations based on standard trigonometric/geometric algorithms to provide a simple and easily understood manner for the user to obtain the cut the user desires. In some examples, digital precision guide system 10 may determine the location for tick mark 18a based conventional trigonometric/geometric algorithms including, but not limited to on one or more of the following equations:

$$A/\text{Sine}(a)=B/\text{Sine}(b)=C/\text{Sine}(c) \qquad \text{Equation 1}$$

$$\text{Additional length}=\text{Thickness of material}*\text{Sin(cut angle)} \qquad \text{Equation 2}$$

$$\text{Additional length}=\text{Width of material}*\text{Sin(bevel angle)}+\text{thickness of material}*\text{Sin(rotation angle)} \qquad \text{Equation 3}$$

where A, B, and C refer to the length of the sides of a triangle, and a, b, c refer to the opposing angles relative to sides A, B, and C. Equations 2 and 3 represent calculations for single angle and compound or dual angle cuts.

Digital precision guide system 10 performs such calculations and determines which individual digital tick mark 18a of the plurality of tick marks 18 by which workpiece 20 must be aligned to obtain the desired cut. The user can then either install a stop block (e.g., if multiple work materials 20 of the same size are needed) or simply align work workpiece 20 with tick mark 18a and perform the desired cut.

In some embodiments digital precision guide system 10 may be a standalone device and provided separate from miter saw 12. For example, digital precision guide system 10 may be provided in the form of a standalone guide rail 16 and corresponding user interface 14 and processor 15 to use with miter saw 12. Guide rail 16 may be an attachment fence or an LED light strip that are aligned relative to fence 13.

Once mounted, guide system 10 can be calibrated by the user to ensure accurate and precise cuts. The calibration can include placing a material having a known length against guide rail 16 and flush with blade 11. The user can input the actual length of the material into user interface 14 and processor 15, which illuminates the crude position of a corresponding tick mark (e.g., tick mark 18b). The user could then manually adjust the location of the illuminated tick mark, via user interface 14 and processor 15, until the illuminated mark aligns with the actual location of the material (e.g., tick mark 18a). Alternatively, the user could physically move guide rail 16 relative to fence 13 until the illuminated tick mark aligns with the edge of workpiece 20.

In some examples, digital guide rail 16 may be in the form of a flexible LED light strip. The strip could include an adhesive backing configured to be adhered to pre-existing guide fence or measurement rail of a saw, cutting table, or other equipment. Such a system would allow for digital guide rail 16 to be applied to various types of machines or devices including, for example, along the measurement rail of the table saw, bandsaw, or other device that typically uses a movable fence to set the position for the material and the user draws the workpiece along a stationary blade as opposed to a miter saw or radial arm saw where the workpiece remains stationary relative to fence 13 and guide rail 16 and the blade is drawn across the material. Once installed, the digital guide rail 16 may be calibrated using the techniques disclosed herein.

In some examples, digital precision guide system 10 may be configured to communicate directly with miter saw 12 to determine the exact setting of the horizontal and vertical cut angles for blade 11. Miter saw 12 could thus communicate directly with user interface 14 and processor 15 to provide such information to the system 10 without the need of user input. The user would simply modify the horizontal or vertical cut angles of miter saw 12 such that they are in the desired position and user interface 14 and processor 15 would use such information to automatically determine the appropriate position for tick mark 18a based on the desired length of the cut.

In some embodiments digital precision guide system 10 may further include a digital tape measure 30 configured to communicate with user interface 14 and processor 15 to provide quick, easy, and reliable measurements to system 10. For example, a user can take digital tape measure 30 and measure the desired length for a particular cut and press corresponding button to read the current length of tape measure 30. This value can then be transferred to user interface 14 and processor 15. The digital precision guide system 10 can then, based on the measured value from digital tape measure 30, illuminate tick mark 18a which corresponds to the precise measured length.

Figure 2:
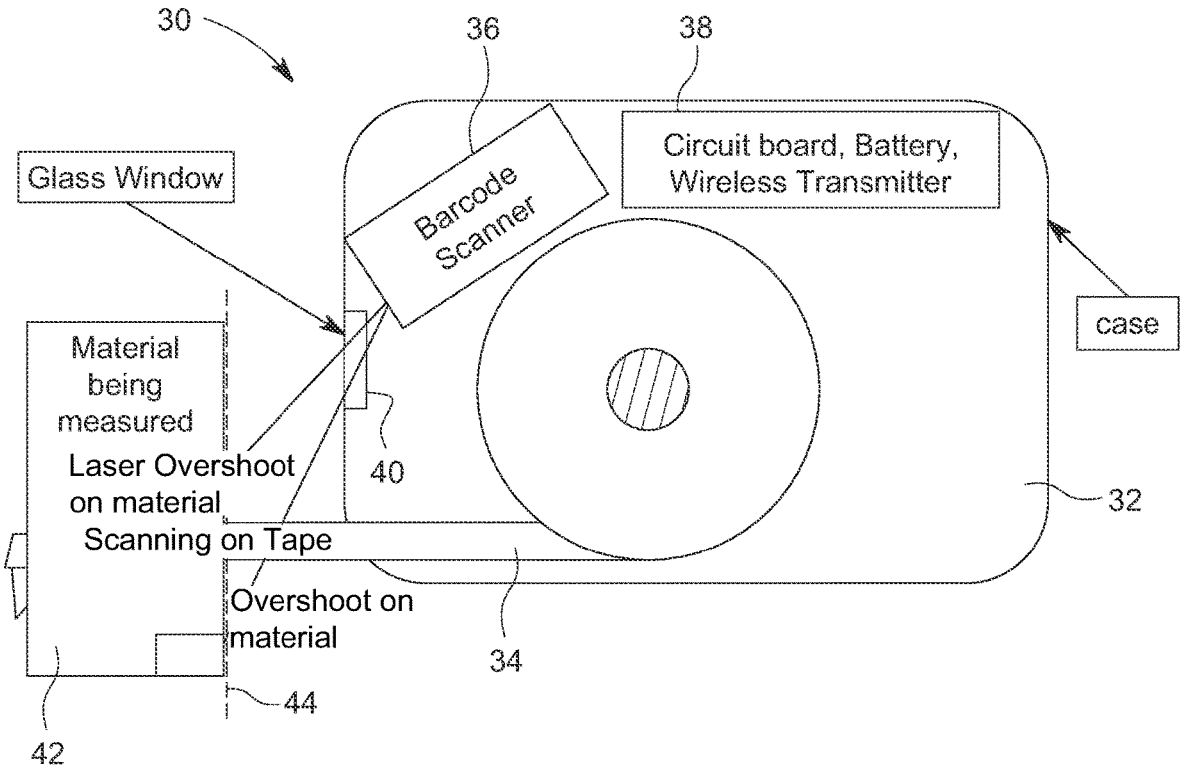
FIG. 2 is a schematic illustration of an example digital tape measure that may be used with the digital precision guide system of FIG. 1.
Figure 3:
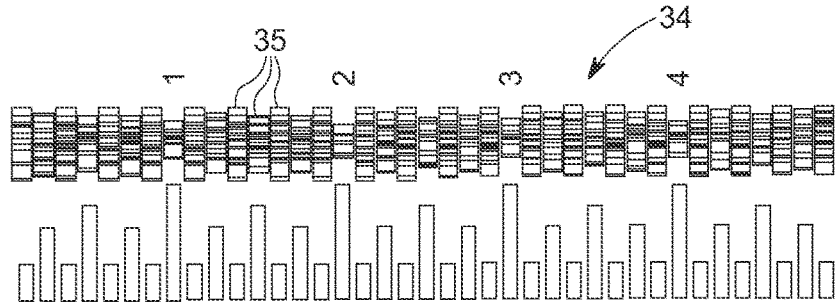
FIG. 3 is a schematic illustration of the measuring tape of the digital tape measure of FIG. 2.

FIGS. 2-4 a schematic illustrations of an example digital tape measure 30 that can be used with precision guide system 10. Digital tape measure 30 includes a housing 32, measuring tape 34, barcode scanner 36, and processing circuitry 38 (e.g., circuit board, battery, wireless transmission capabilities). Measuring tape 34 may include a plurality of barcodes 35 positioned at set intervals along tape 34 as shown in FIG. 3. Housing 32 may include window 40, that allows barcode scanner 36 to be projected through window 40 onto measuring tape 34. Using barcode scanner 36 on measuring tape 34 can help a user know exactly where barcode scanner 36 aligns with the intended measurement. For example, barcode scanner 36 projects a digital line 44 over measuring tape 34 and overlapping material 42, thereby allowing the user to see where the barcode scanner 36 is measuring. This may minimize any drift that could be introduced from other digital measurement systems.

When barcode scanner 36 is aligned with the end of material 42 (or desired length by which the cut is to be performed), the user can push a button on digital to measure 30 to capture the barcode 35 on measuring tape 34 corresponding with the desired length measurement. Several encoding options are open source for barcode programming and can be used to encode the numbers in a decimal fashion for barcode scanner 36 to determine the precise length being measured by measuring tape 34.

In some examples digital tape measure 30 can include one or more buttons 46 corresponding to different measurement functions (e.g., FIG. 4). For example, digital tape measure 30 can include corresponding buttons 46 to record the length, the width, and the thickness of a material. Digital tape measure 30 can also include other useful buttons 46 such as on/off capabilities.

By having a digital measuring tool (e.g., digital tape measure 30) that can record all the length measurement data and communicate such information to precision guide system 10 configured to implement the trigonometric/geometric functions, making simple or complex angled cuts will be much easier and save time and material. For many users, not ever needing to make these kinds of calculations offers several advantages. The user would no longer be required to remember the value of a particular measurement. The user would also avoid making mistakes when reading a tape measure, and there would be no need to count 1/16-inch marks, make a second (or third) measurement, or take the time to make marks on the workpiece. This would save the user valuable time and minimize costly mistakes.

Additionally, or alternatively, system 10 can include a digital angle measurement device 60 configured to measure the horizontal angle and vertical angle of miter saw 12. The digital angle measurement device 60 could then communicate the measured angle directly to user interface 14 and processor 15 (e.g., via wireless communication) to provide those measurements to system 10 for calculation of the desired location for tick mark 18*a* to obtain a desired cut length and cut angle.

In some examples, digital precision guide system 10 may be sold as a kit that includes guide rail 16, user interface 14 and processor 15 configured to communicate with guide rail 16, optionally digital tape measure 30, and optionally digital angle measurement device 60. In other examples, one or more of the above components may be provided as separate components or add-on features (e.g., digital tape measure 30 and digital angle measurement device 60) that are configured to communicate with user interface 14 and processor 15. Offering such components as their own standalone device allows flexibility for the user to determine what features of digital precision guide system 10 are needed for their own personal applications.

In some examples, digital precision guide system 10 may also include a stop mechanism to align with tick mark 18*a*. The stop mechanism may be motorized to move along digital guide rail 16 to correspond with desired tick mark 18*a*. Such movement may be facilitated using a motorized track that moves the stop mechanism into a desired position. Additionally, or alternatively, either digital guide rail 16 or a base component of the real can include pop-up style stops that protrude at or adjacent to the desired tick mark 18*a*. Such stop mechanisms can help to physically show where the end of workpiece 20 should be positioned along guide rail 16.

Figure 7A:
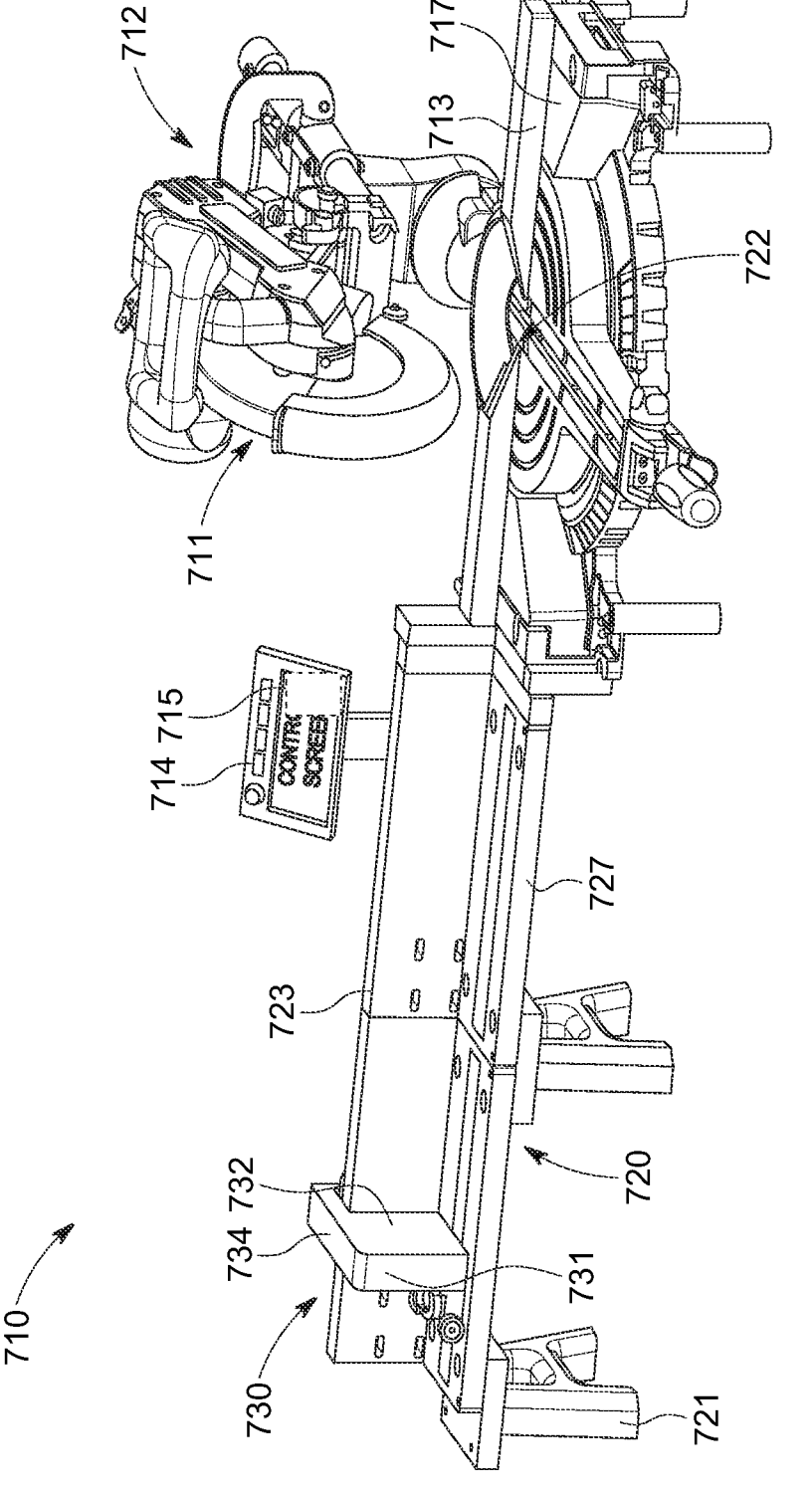
FIGS. 7A and 7B are front and rear perspective views of another illustrative embodiment of an example digital precision guide system in accordance with the present disclosure.

FIGS. 7A and B show an example digital precision guide system 710 that can be incorporated with a machine cutting device (e.g., miter saw 712) to obtain accurate and precise cuts within a workpiece. While the machine cutting device is illustrated as miter saw 712, precision guide system 710 can be included with other cutting devices including, for example, table saws, band saws, radial arm saws, and the like. Miter saw 712 includes base 717, fence 713, and blade 711.

Digital precision guide system 710 includes a user interface 714 that contains a processor and a guide rail assembly 720. Guide rail assembly 720 may have a base portion 727 aligned with base 717 of miter saw and a fence portion 723 aligned with fence 713 of miter saw 712 and operates as a backstop by which the material to be cut (e.g., workpiece 20) can be placed and aligned when the system 710 is installed on the cutting device. As depicted the guide rail assembly 720 may be supported by appropriate legs or stands 721 to align with the miter saw 712 and support a workpiece to be cut.

Digital guide system 710 may further include a stop member 730 that may be disposed adjacent to the guide rail assembly 720 to form a stop for positioning a workpiece to the cut by the miter saw 712. As depicted, the stop member 730 may include a stop member body 731 with a front face 732 that faces saw 712 when in use. An upper arm 734 portion of the stop member body 731 may extend over the guide rail fence portion 723 to a slide member 736. As depicted, the slide member 736 may be formed as a pivot or hinge that allows the stop member 730 to be rotated up and away from the guide rail assembly 720 to allow a user to use the guide rail assembly 720 and cutting device without the utilizing the digital features associated with the stop member 730. Slide member 736 may reside on a rail 745 that extends along the rear surface of the guide rail wall 723.

Figure 7B:
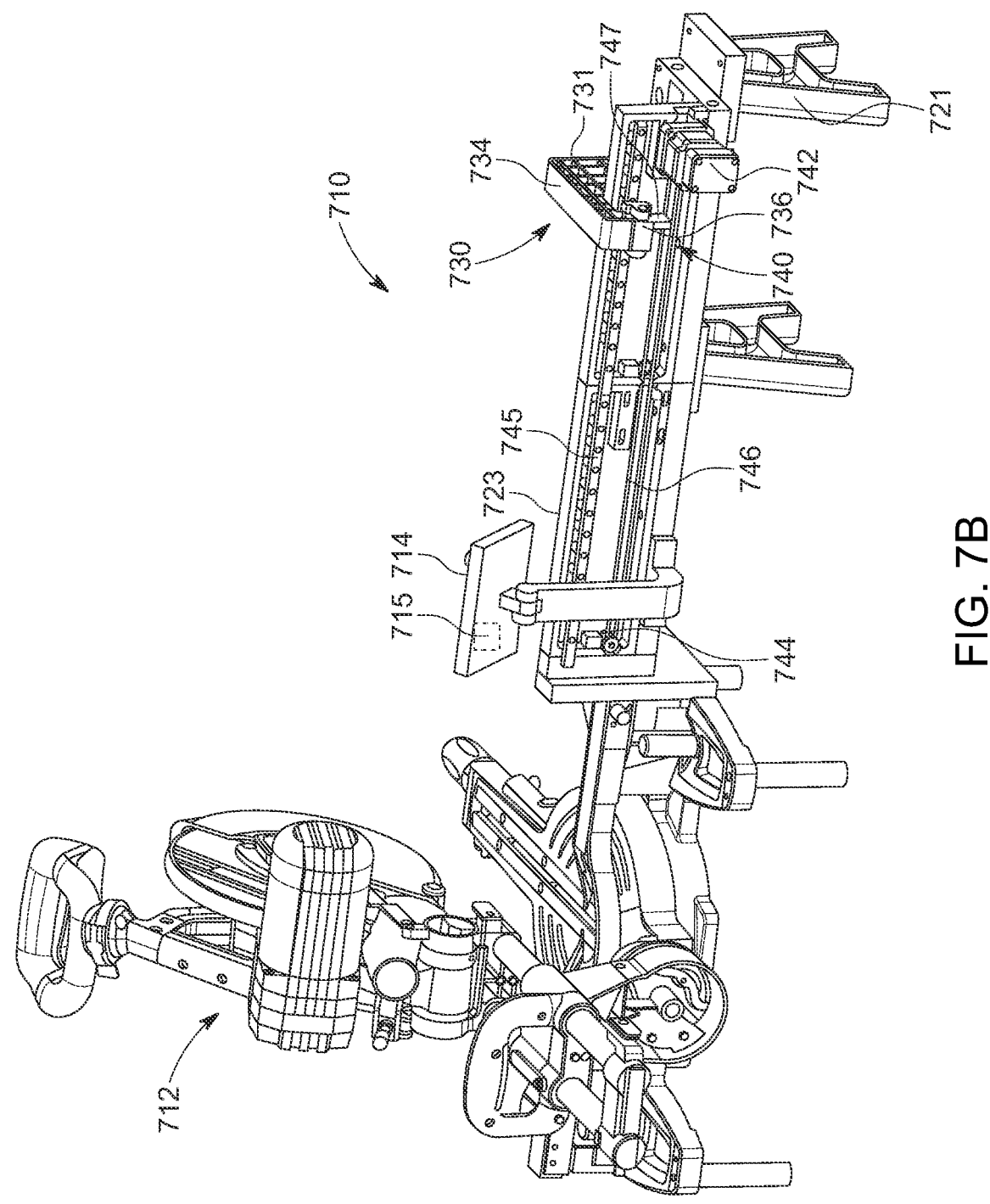

The slide member 736 may be connected to a drive mechanism. In the illustrative embodiment of FIGS. 7A and 7B, the drive mechanism may be a belt drive assembly 740. Belt drive assembly 740 may include a belt 746 disposed on one or more wheels 744 and a drive unit 742 that may include a suitable motor, such as a stepper motor or the electric motor and any necessary transmission elements to actuate the belt 746 to move on wheels 744. A linkage 747 may connect the slide member 736 to belt 746, such that movement of belt 746 moves the stop member to different positions along the guide rail assembly to change the spacing of front face 732 from the miter saw 712.

During operation, a user can input a specified set of measurements into a user interface 714 and processor 715 corresponding to a desired cut the user would like to make within a particular workpiece 20. These measurements may include one or more of the desired length of cut to be made, the vertical cut angle, the horizontal cut angle, the width of workpiece 20, the thickness of workpiece 20, and the corner of workpiece 20 aligned against fence 713 and base 717. Based on the inputted of values, processor 15 can perform the necessary calculations using conventional trigonometric/geometric algorithms to determine where along guide rail 723 that workpiece 20 should be placed to obtain the desired compound angle and length of cut. User interface 714 and processor 715 can then actuate the belt drive assembly 740 to move the stop member 730 to the appropriate position that will allow the user to obtain the desired cut in workpiece 20. Thus, the user only needs to ensure workpiece 20 is aligned at the front face 732 of the stop member 730, and that miter saw 712 is set to the desired vertical and horizontal cut angles to conveniently obtain the desired cut.

User interface 714 and processor 715 may include the necessary processing circuitry and components needed to perform the described trigonometric/geometric calculations to obtain the desired cut. Such components may include, but are not limited to, one or more central processing units, hard drives, virtual memory, wireless communication components, circuit boards, UI input components, display screens, power supply, and the like.

In some embodiments, processor 715 may perform all necessary trigonometric/geometric calculations based on the desired length by which workpiece 20 is to be cut in relation to pivot point 722. Pivot point 722 corresponds to the location at which blade 711 intersects both fence 713 and base 717. In ideal arrangements, pivot point 722 remains constant in reference to blade 711 regardless of the cut angle, particularly with high precision machines. In a simple right angle cut (e.g., a cut where both the vertical and horizontal cut angles are 90°), a user can input the desired cut length for workpiece 20, and user interface device and processor 715 will actuate the drive assembly 740 to move stop member 730 such that front face 730 is positioned to correspond to that distance away from pivot point 22.

While the benefits of digital precision guide system 710 can be obtained with simple 90° cuts, the system offers significant advantages in making cuts in materials having horizontal cut angles, vertical cut angles, or both that can be difficult to calculate by the average user. To calculate the end point in a single angle cut, three pieces of information may be needed; the angle of the saw (e.g., the horizontal or the vertical angle), the width of the material, and the desired total length along one of the corners/sides. When using both axes to make a cut, a user may also need to know the height of the material and the second angle. The math with five variables can be complicated for the average user. Thus, allowing user interface 714 and processor 715 to perform such calculations can significantly improve the accuracy in performing such calculations but also assist with user confidence in approaching such complicated cuts.

In some examples, the calculations may be simplified somewhat by setting up digital precision guide system 710 such that all measurements and calculations are performed relative to pivot point 722. In examples where the user desires to include a vertical cut angle or horizontal cut angle, the user can input the desired length from pivot point 722 (e.g., inside corner cut) into the user interface device 714. Thus, the user would only need to know the length of the corner that aligns with fence 713 and base 717. This in turn can help minimize user error often attributed with failing to account for the thickness of blade 711 or additional complications associated with incorporating the thickness of the material or the width of the material. The goal of digital precision guide system 710 being to diminish errors and improve accuracy and precision in making complex or simple cuts, while simultaneously speeding up the user's ability to get work done with minimal waste, all of which reduces costs to the user.

Additionally, or alternatively, user interface 714 and processor 715 may be configured to allow the user to selectively input which corner/side, relative to pivot point 722, the length of cut is being measured. The user can input a desired length for the corresponding corner into user interface device and processor 714 along with an indication of which corner is being measured relative to the corner that intersects pivot point 722. The user can further provide the width and thickness of workpiece 20, and processor 715 can perform the complex trigonometric/geometric calculations to determine where sop member 730 should be positioned to align the workpiece 20 along guide rail 723 to obtain the desired cut length.

In some examples, the general shape of the material (e.g., half round or other decorative trim boards) to be cut may limit which corner can be aligned with pivot point 722. In such events, the user may need to align a different edge/corner of the material with pivot point 722. As discussed previously herein, these corners may be characterized as the inside short corner 510, inside long corner 512, outside short corner 514, or outside long corner 516 as shown in FIG. 5. The user can select via user interface 714 which associated corner is being aligned with pivot point 722 while processor 715 performs the appropriate calculations to determine where stop member 730 should be placed to provide the proper length of cut. The length inputted by the user would therefore correspond to the desired length along the selected corner.

In examples where both ends of workpiece 20 include non-90° angle cuts, the user may further specify which associated corners of both ends of workpiece 20 is being aligned with the stop member 730. Processor 715 may then perform the additional calculations to determine where the stop member 730 should be positioned. It should be appreciated that when only a single angle cut is being made (e.g., only a horizontal angle cut or only a vertical angle cut is being made), workpiece 20 will only include an inside edge/corner and an outside edge/corner, thereby simplifying the calculations and alignment positions. The user could cycle between; inside to inside, outside to outside, and inside to outside measurements alignments (e.g., in reference to the two ends of workpiece 20) via user interface 714 to obtain the proper orientation for processor 715 to calculate 20 the desired alignment. In some examples, user interface 714 may be programmed with convenient pictorial representations of the alignment of workpiece 20 relative to pivot point 722 for the proper selection and positioning of the selected corner/edge being aligned.

In some examples, the disclosed system 10 may be particularly beneficial for installing trim boards. In such examples, the user may measure the length of the wall needing to receive the trim piece. As discussed previously herein processor 715 calculate the additional length required to obtain the total desired length (e.g., the length of the wall) and the appropriately position stop member 730 to obtain the target cut length for the trim board.

Digital precision guide system 710 offers several advantages and conveniences to the user. Such advantages include reduction of user error affiliated with taking measurements and transferring them to a workpiece. As discussed previously herein with respect to system 10, further improvements can be made by using a digital tape measure 30 or a digital angle measurement device 60 configured to communicate directly with user interface 714 and processor 715. Digital tape measure 30 permits the user to measure a desired length (e.g., the place workpiece 20 is to be installed) and automatically upload precise and accurate measurements to user interface 714 and processor 715, thereby eliminating a possible source of user error in manually entering such measurements.

Digital precision guide system 710 may perform such calculations based on standard trigonometric/geometric algorithms to provide a simple and easily understood manner for the user to obtain the cut the user desires. In some examples, digital precision guide system 710 may determine the location for stop member 730 using conventional trigonometric/geometric algorithms as discussed previously herein.

In some embodiments digital precision guide system 710 may be a standalone device, which can be provided separate from miter saw 712. Once mounted, guide system 710 can be calibrated by the user to ensure accurate and precise cuts. The calibration may include placing a material having a known length against guide rail 723 and flush with blade 711. The user can input the actual length of the material into user interface 714 and processor 715. The user could then manually adjust the location of the stop member 730 to align with the actual location of the material workpiece 20. In some embodiments, the system 710 may calibrate by moving the stop 730 until front face 732 contacts blade 711 or another feature of known distance from blade 711, which may be controlled by processor 715.

In some examples, digital precision guide system 710 may be configured to communicate directly with miter saw 712 to determine the exact setting of the horizontal and vertical cut angles for blade 711. Miter saw 712 could thus communicate directly with user interface 714 and processor 715 to provide such information to the system 710 without the need of user input. The user would simply modify the horizontal or vertical cut angles of miter saw 712 such that they are in the desired position and user interface 714 and processor 715 would use such information to automatically determine the appropriate position for stop member 730 based on the desired length of the cut.

In some embodiments digital precision guide system 710 may further include a digital tape measure 30 configured to communicate with user interface 714 and processor 715 to provide quick, easy, and reliable measurements to system 710. For example, a user can take digital tape measure 30 and measure the desired length for a particular cut and press corresponding button to read the current length of tape measure 30. This value can then be transferred to user interface 714 and processor 715. The digital precision guide system 710 can then, based on the measured value from digital tape measure 30, move top member 730 to the position that corresponds to the precise measured length.

Figures 7C, 7D:
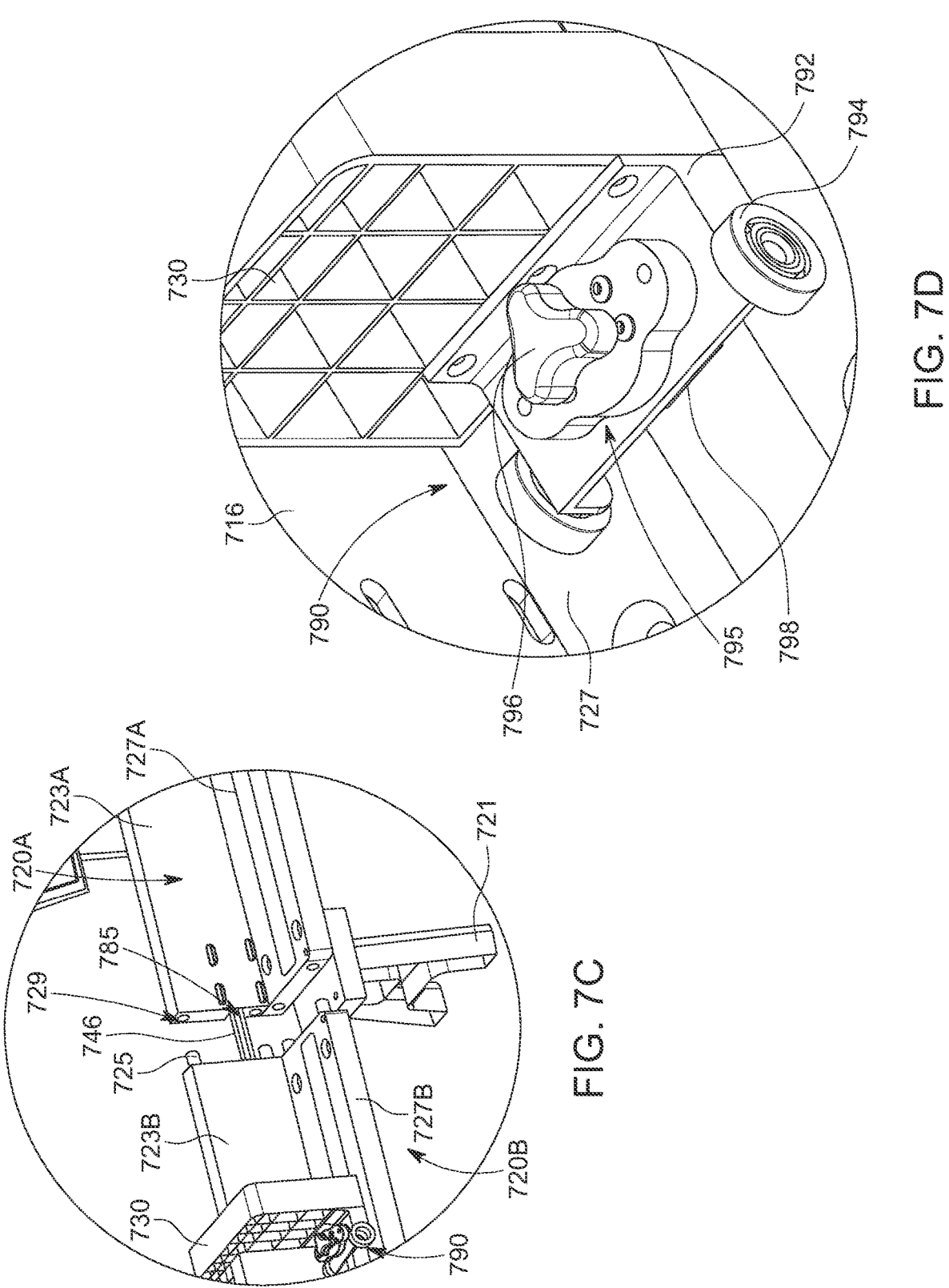
FIGS. 7C and 7D are enlarged partial views of portions of the system of FIGS. 7A and B showing some assembly details thereof.

FIG. 7C depicts one example of a sectional connection for guide rail assembly 720. As depicted the guide rail assembly may be formed from one or more separate sections, such as those depicted at 720A and 720B. Counterpart alignment features such as tabs 725 on the guide rail base 727B and wall 723B and recesses 729 in the guide rail base 727A and wall 723A allow the sections to be accurately aligned. The leg assembly 721 may support the connection of the sections. The use of sections allows the length of the guide rail assembly to be adjusted for use in different locales and for cutting various substrates that have differing lengths. Additionally, a user may be able to purchase sections separately to expand a system 710 when needed.

It is noted that belt 746 depicted in FIG. 7C resides in a belt recess 785 formed in the rear of the fence 723 that provides protection for the belt and its movement during use. Users may be provided with various interchangeable belts for use with differing numbers of sections.

Additionally, a stop lock assembly 790 is depicted and is shown in more detail in FIG. 7D. Stop lock assembly 790 may include a carriage body 792. In some embodiments, the carriage body may be attached to the stop member 730 opposite front face. In the depicted embodiment, wheels 794 allow the carriage to smoothly move along the rail 720 as the stop member position is adjusted. A locking assembly 795 may be used to secure the stop lock assembly in a position and thereby prevent movement of the stop member 730. In the depicted embodiment, the locking assembly 790 includes a twist-activated handle 796 that may be used to actuate a locking member or mechanism 798, assembly. In the depicted embodiment, the locking mechanism may be a magnet that is brought into contact with a metal component of the guide rail assembly, such as a metal insert, to secure thereto. In other embodiments it could be a locking member that extends into a recess, or an expanding member that expands in a central rail slot to secure thereto. This may help prevent the stop member from movement during cutting, as by flexion of belt 746 or otherwise. In some embodiments, the user may loosen the stop in order to allow the system 710 to move the stop member 730 and then secure it before cutting material with the saw 712. In some embodiments, instead of a handle, the locking mechanism could be activated by a solenoid or other actuator controlled by the processor 715.

Figure 8:
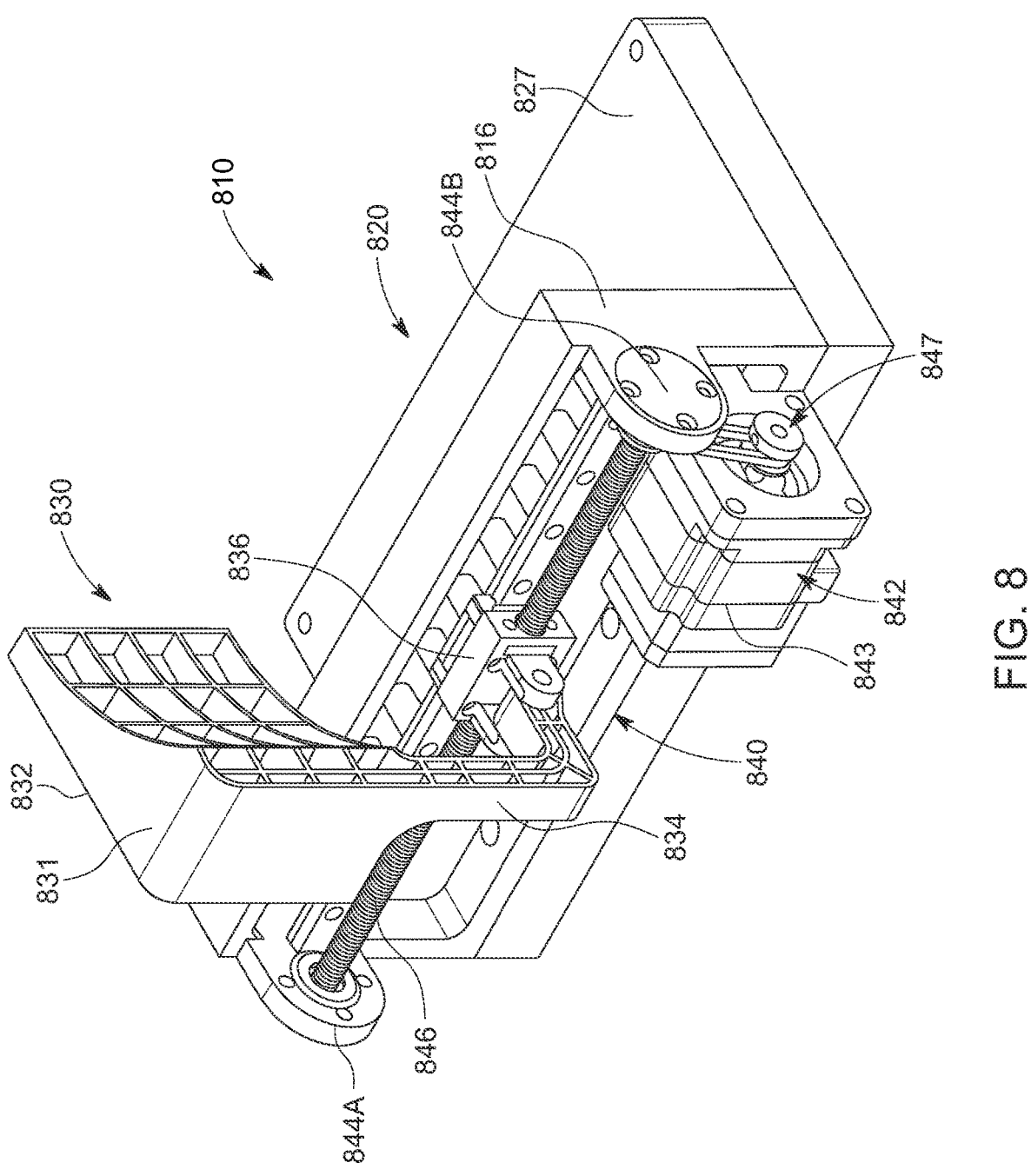
FIG. 8 is a rear perspective view of a portion of another illustrative embodiment of an example digital precision guide system in accordance with the present disclosure.

FIG. 8 shows an example of a section of a guide rail 820 for a digital precision guide system 810 that can be incorporated with a machine cutting device to obtain accurate and precise cuts within a workpiece, which uses an alternate drive mechanism. As with the other systems discussed previously herein, precision guide system 810 can be included with various cutting devices including, for example, miter saws, table saws, band saws, radial arm saws, and the like.

Digital precision guide system 810 includes guide rail assembly 820 which may have a base portion 827 and a fence portion 816 that may be aligned with the base and fence of a cutting device for use and operate as a backstop against which the material to be cut (e.g., workpiece 20) can be placed and aligned. Digital guide system 810 may further includes a stop member 830 that may be disposed adjacent to the guide rail assembly 820 to form a stop for positioning a workpiece to be cut. As depicted, the stop assembly 830 may include a stop member body 831 with a front face 832. An upper arm 834 portion of the stop member body 831 may extend over the guide rail fence portion 823 to a linkage 836. As depicted, the linkage 836 may be formed as a pivot or hinge that allows the stop member 830 to be rotated up and away from the guide rail assembly 820 to the depicted retracted position to allow a user to use the guide rail assembly 820 on a cutting device without the utilizing the digital features associated with the stop member 830. The linkage may also reside on a rail.

The linkage 836 may be connected to a drive mechanism. In the illustrative embodiment of FIG. 8, the drive mechanism may be a screw-drive assembly 840. Screw-drive assembly 840 may include a threaded shaft 846 disposed between two bearing assemblies 844A and 844B that allow it to rotate. A drive unit 842 that may include a suitable motor 843, such as a stepper motor or other electric motor may actuate a drive linkage 847 to rotate the threaded shaft. Linkage 836 may have a base with a threaded bore that resides on the threaded shaft 846, such that rotation of the shaft 846 moves the stop member to different positions along the guide rail assembly to change the spacing of the front face 832. On other embodiments, a rack and pinion type drive member may be used, but it will be appreciated that any suitable drive assembly that can be controlled by the processor may be used.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A digital precision guide system comprising:
a guide rail configured to be positioned adjacent to a cutting machine;
an indicator assembly for indicating a position for positioning of a first end of a substrate placed on the guide rail to be cut by the cutting machine to obtain a substrate of a desired length, comprising
a moveable stop member that is disposed adjacent to the guide rail, and
a drive assembly,
wherein the moveable stop member is actuated by the drive assembly to move to a position that corresponds to the desired cut length away from a blade of the cutting machine, such that when the first end of the substrate placed on the guide rail is in contact with the stop member, the length of the substrate from contact with the stop member to a point of cutting corresponds to the desired cut length,
a stop lock assembly attached to the moveable stop member for preventing movement of the moveable stop member during cutting, the moveable stop member comprising a carriage and a locking mechanism;
a user interface in communication with a processor, wherein the processor is configured to receive at least a desired cut length from the user interface and actuate the indicator assembly to indicate the position for positioning the first end of the substrate placed on the guide rail that corresponds to the desired cut length away from a blade of the cutting machine.

2. The digital precision guide system of claim 1, wherein the moveable stop member is attached to a slide member disposed on a slide rail attached to the guide rail.

3. The digital precision guide system of claim 2, wherein the drive assembly comprises a belt that is driven by a motor controlled by the processor, wherein the slide member is connected to the belt.

4. The digital precision guide system of claim 2, wherein the drive assembly comprises a threaded shaft that is rotated by a motor controlled by the processor, wherein the slide member is connected to the threaded shaft.

5. The digital precision guide system of claim 2, wherein the moveable stop member is pivotally attached to the slide member, such that the moveable stop member can be rotated away from the guide rail and thereby allow the cutting machine to be used in a normal manner without the moveable stop member.

6. The digital precision guide system of claim 1, further comprising at least one of a digital tape measure or a digital angle measurement device configured to wirelessly transmit a desired cut length or cut angle to the processor.

7. The digital precision guide system of claim 1, wherein the guide rail is formed from multiple sections of guide rail assemblies that may be connected to form a guide rail assembly of a desired length.

8. The digital precision guide system of claim 1, wherein the locking mechanism comprises a magnet that is brought into contact with a metal portion of the guide rail.

9. The digital precision guide system of claim 1, wherein the locking mechanism is actuated by a handle disposed on the carriage.

10. A digital precision guide system, comprising:
a guide rail configured to be positioned adjacent to a cutting machine;
an indicator assembly for indicating a position for positioning of a first end of a substrate placed on the guide rail to be cut by the cutting machine to obtain a substrate of a desired length, comprising a plurality of LED indicator tick marks disposed on the guide rail, wherein the plurality of LED indicator tick are separated along the guide rail by set intervals and are actuated by illuminating a corresponding LED indicator of the plurality of LED indicator tick marks;
a user interface in communication with a processor, wherein the processor is configured to receive at least a desired cut length from the user interface and actuate the indicator assembly to indicate the position for positioning the first end of the substrate placed on the guide rail that corresponds to the desired cut length away from a blade of the cutting machine.

11. A precision guide system comprising:
a guide rail configured to be positioned adjacent to a cutting machine;
an indicator assembly for indicating a position for positioning of a first end of a substrate placed on the guide rail to be cut by the cutting machine to obtain a substrate of a desired length, comprising
a moveable stop member that is disposed adjacent to the guide rail, and
a drive assembly,
wherein the moveable stop member is actuated by the drive assembly to move to a position that corresponds to the desired cut length away from a blade of the cutting machine, such that when the first end of the substrate placed on the guide rail is in contact with the stop member, the length of the substrate from contact with the stop member to a point of cutting corresponds to the desired cut length,
a stop lock assembly attached to the moveable stop member for preventing movement of the moveable stop member during cutting, the moveable stop member comprising a carriage and a locking mechanism;
a processor configured to receive at least a desired cut length and actuate the indicator assembly to indicate the position for positioning the first end of the substrate placed on the guide rail that corresponds to the desired cut length away from a blade of the cutting machine.

12. The precision guide system of claim 11, wherein the moveable stop member is attached to a slide member disposed on a slide rail attached to the guide rail.

13. The precision guide system of claim 11, wherein the drive assembly comprises a belt that is driven by a motor controlled by the processor.

14. The precision guide system of claim 11, wherein the drive assembly comprises a threaded shaft that is rotated by a motor controlled by the processor.

15. The precision guide system of claim 11, wherein the moveable stop member is pivotally attached to the system, such that the moveable stop member can be rotated away from the guide rail and thereby allow the cutting machine to be used in a normal manner without the moveable stop member.

16. The precision guide system of claim 11, further comprising at least one of a digital tape measure or a digital angle measurement device configured to wirelessly transmit a desired cut length or cut angle to the processor.

17. The precision guide system of claim 11, wherein the guide rail is formed from multiple sections of guide rail assemblies that may be connected to form a guide rail assembly of a desired length.

18. The precision guide system of claim 11, wherein the locking mechanism comprises a magnet that is brought into contact with a metal portion of the guide rail.

19. The precision guide system of claim 11, wherein the locking mechanism is actuated by a handle disposed on the carriage.

20. A precision guide system comprising:
a guide rail configured to be positioned adjacent to a cutting machine;
an indicator assembly for indicating a position for positioning of a first end of a substrate placed on the guide rail to be cut by the cutting machine to obtain a substrate of a desired length, comprising a plurality of LED indicator tick marks disposed on the guide rail, wherein the plurality of LED indicator tick are separated by set intervals and are actuated by illuminating a corresponding LED indicator of the plurality of LED indicator tick marks;
a processor configured to receive at least a desired cut length and actuate the indicator assembly to indicate the position for positioning the first end of the substrate placed on the guide rail that corresponds to the desired cut length away from a blade of the cutting machine.

* * * * *